United States Patent [19]

Eklund et al.

[11] Patent Number: 4,861,874

[45] Date of Patent: Aug. 29, 1989

[54] METHOD OF LOWERING THE CARBAMATE CONTENT OF CELLULOSE CARBAMATE PRODUCTS USING A BASE/ALKALI METAL SALT MIXTURE

[75] Inventors: Vidar Eklund; Jan Fors; Leo Mandell; Kerstin Meinander, all of Porvoo; Johan-Fredrik Selin, Helsinki; Olli T. Turunen, Porvoo, all of Finland

[73] Assignee: Neste Oy, Finland

[21] Appl. No.: 178,546

[22] Filed: Apr. 7, 1988

[30] Foreign Application Priority Data

Jul. 7, 1987 [FI] Finland ................................ 872992

[51] Int. Cl.$^4$ ................ D06M 1/02; D01F 2/00; C08B 15/06

[52] U.S. Cl. ..................................................... 536/32
[58] Field of Search ......................................... 536/32

[56] References Cited

U.S. PATENT DOCUMENTS 4,583,984  4/1986  Turunen et al. .................. 264/344

Primary Examiner—John Kight
Assistant Examiner—Frederick Krass
Attorney, Agent, or Firm—Steinberg & Raskin

[57] ABSTRACT

The carbamate content of cellulose carbamate products is reduced by treating such products with solutions of a base, which solution also contains one or several alkali metal salts, particularly carbonates, sulfates, phosphates, borates and acetates.

13 Claims, No Drawings

METHOD OF LOWERING THE CARBAMATE CONTENT OF CELLULOSE CARBAMATE PRODUCTS USING A BASE/ALKALI METAL SALT MIXTURE

BACKGROUND OF THE INVENTION

The invention relates to the lowering of the number of carbamate groups in products made of cellulose carbamate. As is well known, cellulose carbamate is a compound formed when cellulose is heated at elevated temperature in the presence of urea. Cellulose carbamate is an alkali-soluble compound, and this permits it to be converted into the shape of various products by preparing an alkaline solution thereof and then precipitating the products from the solution in desired form, for example, as fibers, films, spongy products, etc.

One of the factors which influences the properties of cellulose carbamate products, and consequently the use thereof, is the carbamate content, that is the number of carbamate groups in the cellulose chains. It is known that carbamate groups to a certain extent increases the sensitivity of the products to water and as a consequence has an effect on the wet strength of the products.

It is possible by reducing the number of carbamate groups to influence the wet strength properties of the products to a desired degree. U.S. Pat. No. 4,583,984 discloses a process for lowering the quantity of carbamate by treating the products with alkali solutions. This procedure in principle makes it possible to completely eliminate the carbamate groups, whereby products consisting of regenerated cellulose are obtained.

It has been found, however, that the lowering of the quantity of carbamate groups with the aid of alkali has an adverse effect on certain strength characteristics, particularly in the case of industrial scale wherein maximum fast and efficient removal of carbamate groups is aimed at, for example, using concentrated alkali solutions or high treatment temperatures.

SUMMARY OF THE INVENTION

It is accordingly a primary object of the present invention to provide a process for the lowering of the carbamate content of products made from cellulose carbamate without incurring the above mentioned drawbacks.

It is another object of the present invention to provide products made of cellulose carbamate with the carbamate content thereof reduced in accordance with the process of the invention.

Other objects and advantages of the present invention will be apparent from a reading of the specification and of the appended claims.

With the above and other objects in view, the present invention mainly comprises the lowering of the carbamate content of products made of cellulose carbamate by treating such products with solutions of a base which contain one or several alkali metal salts, particularly alkali metal carbonates, sulfates, phosphates, borates and acetates.

The base used in the process of the invention should be a strong inorganic or organic base. From the standpoint of price and efficiency of treatment, the inorganic bases are preferred, namely alkali metal hydroxides, particularly sodium hydroxide. The preferred solvent is water. The preferred organic base is tetramethylammonium hydroxide. The concentration of the base is preferably in the range of 0.5 to 5% by weight.

The alkal metal salts used according to the present invention are those which are highly soluble in basic solutions. Among the salts are the carbonates, sulfates, phophates, borates and acetates of the alkali metals. The preferred alkali metal is sodium.

Consequently, the preferred salts according to the present invention are one or more of the salts: sodium carbonate, sodium sulfate, sodium borate and sodium acetate. The preferred quantity of the salt is 5–35% by weight. This quantity refers to the quantity of dry salt. The quantities may be correspondingly increased when the salts contain water of crystallization.

The treatment according to the present invention is preferably performed at elevated temperatures, of from room temperature to 120° C. When low temperatures are employed, there is a risk that the treatment time will become too long, although lower temperatures can be used. However, in the case of an industrial process, the treatment time should not be long and the high reaction speed is therefore aimed at by elevating the reaction temperature and/or using a concentrated base solution. The most suitable treatment temperature is between about 80°–100° C. and the treatment time at this temperature may be five seconds to ten minutes.

The treatment is conveniently carried out by immersing the product to be treated, for the desired time, at the desired temperature, in the treatment solution. The products to be treated may be in any conceiveable form. From the standpoint of industrial efficiency, it is preferred that the product be in the form of a continuous product which is passed through the treatment solution at such speed that the product will be in contact with the solution for the desired time.

Subsequent to the treatment, the product is washed, for example, with water. The washing water may contain a small amount of acid in order to eliminate any base that may have remained in the product. A suitable acid for this purpose is acetic acid. The products are then dried in normal manner.

DESCRIPTION OF PREFERRED EMBODIMENTS

The following examples are given to illustrate the present invention. The scope of the invention is not, however, meant to be limited to the specific details of the examples.

In these examples, the amount of carbamate groups was characterized by means of the nitrogen content as measured by means of the so called Kjeldahl method. The method has been described, e.g., in: Snell-Hilton, Encyclopedia of Industrial Chemical Analysis, Interscience Publishers, New York, 1968, Vol. 2, p. 530.

EXAMPLE 1

Cellulose carbamate fibers were prepared by impregnating bleached sulfite cellulose with urea. Impregnation was accomplished by immersing the cellulose in liquid ammonia containing 16% urea and 20% waer. Upon impregnation the cellulose was dried at room temperature to remove the ammonia, and thereafter at 100° C. to remove the water. The dry, impregnated cellulose was heated at 140° C. during 3 hrs., whereby it was converted to cellulose carbamate, which had, after washing with water, a nitrogen content of 3.4%, calculated on the dry matter.

This cellulose carbamate was activated by soaking it in water for one hour, followed by NaOH addition and dissolving of the cellulose carbamate products, with agitation at −5° C., during one hour. The solution thus obtained was yellowish, and clear. It was filtered and deaerated by vacuum treatment. The solution thus obtained was spun with a miniature spinning machine through a nozzle piece with 300 holes of 50 μm diameter, into a precipitation bath containing 8% sulphuric acid and 20% $Na_2SO_4$.

The cellulose carbamate sheets thus obtained were treated with an aqueous solution containing 2% by weight sodium hydroxide and 10% by weight sodium carbonate. The treatment was carried out by immersing the fibers at 90° C. in the treatment solution, in which they were kept for treatment periods of different lengths. After treatment, the fibers were washed with water containing some acetic acid.

The characteristics of the fibers used for starting material and of those which were obtained are set forth in Table 1.

TABLE I

| Characteristic | Treatment time, s | | | |
|---|---|---|---|---|
| | 0 | 30 | 60 | 120 |
| Nitrogen content, % | 2.3 | 1.20 | 0.81 | 0.41 |
| dtex | 1.1 | 2.12 | 2.08 | 2.02 |
| Tensile strength when dry, cN/dtex | 2.43 | 2.33 | 2.46 | 2.35 |
| Breaking elongation, % | 8.6 | 14.9 | 14.7 | 14.2 |
| Loop strength, cN/dtex | 0.31 | 0.45 | 0.42 | 0.44 |

EXAMPLE 2

As in Example 1, cellulose carbamate fibers were produced, and treated with an aqueous solution containing 2% by weight sodium hydroxide and 20% by weight sodium carbonate. The treatment was carried out at 90° C., using various treatment times. After treatment, the fibers were washed with water containing acetic acid, and dried.

The characteristics of the fibers thus obtained are set forth in Table 2.

TABLE 2

| Characteristic | Treatment time, s | | | |
|---|---|---|---|---|
| | 0 | 30 | 60 | 120 |
| Nitrogen content, % | 2.08 | 0.91 | 0.47 | 0.32 |
| dtex | 1.53 | 1.59 | 1.58 | 1.54 |
| Tensile strength when dry, cN/dtex | 2.30 | 2.52 | 2.39 | 2.44 |
| Breaking elongation, % | 9.2 | 11.4 | 11.9 | 11.4 |
| Loop strength, cN/dtex | 0.36 | 0.39 | 0.39 | 0.40 |

EXAMPLE 3

As in Example 1, cellulose carbamate fibers were produced, and treated with an aqueous solution containing 4% by weight sodium hydroxide adn 20% by weight sodium carbonate. The treatment was carried out at 100° C., using various treatment times. After treatment, the fibers were washed with water containing acetic acid.

The characteristics of the fibers thus obtained are set forth in Table 3.

TABLE 4

| Characteristic | Treatment time, s | | | |
|---|---|---|---|---|
| | 0 | 30 | 60 | 120 |
| Nitrogen content, % | 3.03 | 0.56 | 0.41 | 0.26 |
| dtex | 1.60 | 1.79 | 1.81 | 1.76 |

TABLE 4-continued

| Characteristic | Treatment time, s | | | |
|---|---|---|---|---|
| | 0 | 30 | 60 | 120 |
| Tensile strength when dry, cN/dtex | 2.59 | 2.40 | 2.49 | 2.43 |
| Breaking elongation, % | 8.6 | 16.5 | 15.8 | 16.4 |
| Loop strength, cN/dtex | 0.29 | 0.57 | 0.655 | 0.64 |

EXAMPLE 5

As in Example 1, cellulose carbamate fibrs were produced, and treated with an aqueous solution containing 4% by weight sodium hydroxide and 26% by weight sodium sulfate. The treatment was carried out at 100° C., using various treatment times. After treatment, the fibers were washed with water containing acetic acid, and dried.

The characteristics of the fiber thus obtained are set forth in Table 5.

TABLE 5

| Characteristic | Treatment time, s | | |
|---|---|---|---|
| | 0 | 30 | 60 |
| Nitrogen content, % | 3.03 | 0.58 | 0.40 |
| dtex | 1.60 | 1.77 | 1.70 |
| Tensile strength when dry, cN/dtex | 2.59 | 2.33 | 2.47 |
| Breaking elongation, % | 8.3 | 16.1 | 14.6 |
| Loop strength, cN/dtex | 0.29 | 0.63 | 0.49 |

COMPARISON EXAMPLE 1

As in Example 1, cellulose carbamate fibers were produced, and treated with a 2% by weight aqueous solution of sodium hydroxide. The treatment was carried out at 100° C., using various treatment time. After treatment, the fibers were washed as in Example 1.

The characteristics of the fibers thus obtained are set forth in Table 6.

TABLE 6

| Characteristic | Treatment time, s | | | |
|---|---|---|---|---|
| | 0 | 30 | 60 | 120 |
| Nitrogen content, % | 2.31 | 0.89 | 0.59 | 0.34 |
| dtex | 2.15 | 2.33 | 2.41 | 2.26 |
| Tensile strength when dry, cN/dtex | 2.28 | 1.74 | 1.72 | 1.95 |
| Breaking elongation, % | 10.4 | 23.9 | 25.3 | 20.6 |

COMPARISON EXAMPLE 2

Comparison Example 1 was repeated, using the treatment temperature 90° C. The results are presented in Table 7.

TABLE 7

| Characteristic | Treatment time, s | | | |
|---|---|---|---|---|
| | 0 | 30 | 60 | 120 |
| Nitrogen content, % | 2.22 | 1.18 | 0.79 | 0.45 |
| dtex | 2.07 | 2.39 | 2.39 | 2.35 |
| Tensile strength when dry, cN/dtex | 2.36 | 1.74 | 1.75 | 1.88 |
| Breaking elongation, % | 8.6 | 24.2 | 24.8 | 27.4 |

Comparison Examples 1 and 2 reveal that when cellulose carbamate fibers are treated with a basic solution which does not contain soluble alkali metal salts as in Examples 1-5, the strength of the product is impaired and the elongation considerably increased.

While the invention has been set forth with respect to specific treatment solutions, it is apparent that variations and modifications can be made without departing from the spirit or scope of the invention.

What is claimed is:

1. Method of lowering the carbamate content of cellulose carbamate without adversely affecting strength and elongation characteristics thereof, which comprises contacting cellulose carbamate with a solution of an alkali or organic base and also containing in solution at least one soluble alkali metal salt.

2. Method according to claim 1 wherein said alkali metal salt is an alkali metal carbonate, sulfate, phosphate, borate or acetate.

3. Method according to claim 1 wherein said base solution is in aqueous 0.5–5% sodium hydroxide solution.

4. Method according to claim 2 wherein said base solution is 0.5–5% aqueous sodium hydroxide solution.

5. Method according to claim 1 wherein the content of alkali metal salt in the solution is about 5–35% by weight, calculated as dry salt.

6. Method according to claim 4 wherein the alkali metal salt content of said solution is about 5–35% by weight, calculated as dry salt.

7. Method according to claim 1 wherein said alkali metal salt is a sodium salt.

8. Method according to claim 4 wherein said alkali metal salt is a sodium salt.

9. Method according to claim 1 wherein the thus treated cellulose carbamate is then washed.

10. Method according to claim 9 wherein the washing is with water.

11. Method according to claim 9 wherein the washing is effected with water containing acetic acid.

12. Method according to claim 1 wherein said base is in solution in an amount of 2–5% by weight.

13. Method according to claim 2 wherein said base solution is a 2–5% aqueous sodium hydroxide solution.

* * * * *